United States Patent
Hattori

(10) Patent No.: US 7,023,774 B2
(45) Date of Patent: Apr. 4, 2006

(54) OPTICAL DISC DEVICE CAPABLE OF RECORDING OR READING WITH HIGH EFFICIENCY

(75) Inventor: Katsuki Hattori, Kiryu (JP)

(73) Assignee: Sanyo Electric Co., Ltd., Osaka (JP)

( * ) Notice: Subject to any disclaimer, the term of this patent is extended or adjusted under 35 U.S.C. 154(b) by 411 days.

(21) Appl. No.: 10/455,946

(22) Filed: Jun. 6, 2003

(65) Prior Publication Data

US 2004/0076100 A1  Apr. 22, 2004

(30) Foreign Application Priority Data

Oct. 21, 2002 (JP) .............................. 2002-305764

(51) Int. Cl.
*G11B 5/09* (2006.01)
*G11B 7/00* (2006.01)

(52) U.S. Cl. ................. 369/47.53; 369/47.5; 369/53.2; 369/47.1

(58) Field of Classification Search ..................... None
See application file for complete search history.

(56) References Cited

U.S. PATENT DOCUMENTS

| 6,411,580 B1* | 6/2002 | Kimura et al. ........... 369/59.17 |
| 2001/0024410 A1* | 9/2001 | Kumai et al. ............ 369/47.24 |

FOREIGN PATENT DOCUMENTS

| JP | 2002-025064 | 1/2002 |
| JP | 2002-056617 | 2/2002 |

* cited by examiner

*Primary Examiner*—Muhammad Edun
(74) *Attorney, Agent, or Firm*—Hogan & Hartson, L.L.P.

(57) ABSTRACT

High efficiency recording is carried for recording recording data generated by a second recording system signal processing circuit 11 to a recording disc corresponding to an existing first standard, and in this case the recording data generated by the second recording system signal processing circuit 11 is selectively recorded to the first recording disc based on one of a first or a second standard. In this way, high efficiency recording is possible regardless of whether data has a recording format corresponding to the first standard or the second standard.

4 Claims, 5 Drawing Sheets

OPTICAL DISC DEVICE CAPABLE OF RECORDING OR READING WITH HIGH EFFICIENCY

BACKGROUND OF THE INVENTION

1. Field of the Invention

The present invention relates to an optical disc device capable of recording, in a disc corresponding to an existing data format standard, record data with high efficiency using a data format conforming to a standard having higher data format efficiency than the existing standard, and to an optical disc device for reading a disc recorded with high efficiency.

2. Description of the Related Art

The CD (compact disc) standard, and the DVD (Digital Versatile Disc) standard responding to demands for high capacity as well as ensuring mechanical compatibility by having the same disc diameter as a CD, are known as standards for optical discs for performing recording and reading optically using an optical head.

In a DVD drive for handling this DVD, upward compatibility with a CD is ensured and it is possible to read CDs also.

Recordable optical discs exist for both the CD and DVD systems, and the CD recording system is unified for CD-R (Recordable) and CD-RW (ReWritable), while the DVD recording system currently has various candidate standards and no de facto standard has yet been defined.

Regarding the recording capacity that can be recorded on a disc, compared to a CD, a DVD has an overwhelmingly larger capacity, and in conditions where data amount of files handled by a personal computer is increased, since the standard recording capacity of a CD-R or CD-RW is 650 MB (megabytes) or 700 MB, there are situations where this recording capacity is insufficient.

However, the CD standard recording methods are unified, as has been described previously, and CD-R/RW drives have become widespread, and therefore LSIs for recording system signal processing circuits for CD-R and CD-RW are available cheaply, and also discs for CD-R and CD-RW are cheaply available on the market.

A system has been proposed for, while adopting the CD standard data format, that is, CD modulation code (EFM) and error correction code (ECC), shortening the length of recording marks made up of pits and lands for recording on the disc, to increase the linear density compared to that of the standard and give increased disc recording capacity.

SUMMARY OF THE INVENTION

As described above, if the data format of the current standard is adopted in an attempt to extend the recording capacity, it is possible to use cheap recording system signal processing circuit LSIs that are available on the market and easy to design, and it is also possible to use currently available CD-R and CD-RW discs.

However, since format efficiency is fixed depending on the data format, it is not possible to improve format efficiency to perform high efficiency recording on a disc, and in the event that a laser beam of a wavelength conforming to the standard is used in recording and reading of the disc it is not possible to significantly shorten the length of recording marks due to the laser spot diameter on the disc, and there is a problem that density can not be made sufficiently high.

For this reason, further consideration has been given to improving format efficiency to bring about high efficiency recording on a disc, but in this case, inconveniencies arise from points of difference of the data format due to the standard.

Specifically, in the case where record data corresponding to data formats of two types of differing standards can be recorded on a recording disc specified by one of the standards, if the type of disc is detected using disc discrimination, identification data representing that type of disc is notified to a host device, operation processing for the host device and operation control for a disc device using the host device are carried out in response to that notification, and depending on the recording format of record data corresponding to data format of the standard different from the disc for recording, correct reading can not be carried out using the disc device or even if correct reading can be carried out using the disc device, there will be cases where correct reading processing of that read data is not possible using the host device.

For example, in the case of high density recording conforming to a DVD standard data format on a recording CD, it is possible to support both content for CD, being data of a CD-DA standard or video CD standard, and content for DVD, being data of a DVD video standard or a DVD audio standard. However, since a disc loaded in the disc device is a CD for recording, the disc device notifies a personal computer of an identification code, being the host device, indicating CD type media.

The personal computer receiving this notification enters a state where it is possible to use only CD driver software in the recording system, and enters a state where software for CD content is used in the reading system.

Accordingly, without doing anything else, it is not possible to perform high efficiency recording of data corresponding to DVD content in a recording CD, and at the same time even if it becomes possible to record data of a recording format corresponding to DVD content in a recordable CD with high efficiency, it becomes not possible to correctly read data corresponding to DVD content recorded with high efficiency on the recording CD.

The present invention comprises a first recording system signal processing circuit for subjecting input data to signal processing so as to generate record data corresponding to a data format conforming to a current first standard, and a second recording system signal processing circuit for carrying out signal processing for input data so as to generate record data corresponding to a data format conforming to a second standard having a higher format efficiency than the first standard, wherein, when recording to a first recording disc corresponding to the first standard, it is possible to selectively use one of the first or second recording system signal processing circuits, and when that record data generated using the second recording system signal processing circuit is recorded to the first recording disc, a control processing configuration is switched using a host device for selectively recording record data generated using the second recording system signal processing circuit to the first recording disc based on a recording format conforming to one of the first or second standards.

The present invention also comprises a first reading system signal processing circuit for carrying out signal processing for readout data read out from a disc for decoding record data corresponding to a data format conforming to a first standard, a second reading system signal processing circuit for carrying out signal processing for readout data read out from a disc for decoding record data corresponding to a data format conforming to a second standard, and recording format determining means for determining a recording format of the data when it has been determined that there is a disc that has been recorded in high efficiency mode, wherein, together with a determination as to whether or not read out data read-out from a disc corresponding to a first standard corresponds to a data format conforming to either a first standard or a second standard, when it is discriminated by this determination that the data corresponds to a data format conforming to a first standard, the readout data is supplied to the first reading system signal processing circuit, when it is discriminated that the data corresponds to a data format conforming to a second standard, the readout data is supplied to the second reading system signal processing circuit, and, a first standard system reading function, for subjecting record data, recorded on a disc using a high efficiency recording mode with a recording format based on a first standard, to reading processing corresponding to that recording format, and a second standard system reading function, for subjecting record data, recorded on a disc using a high efficiency recording mode with a recording format based on a second standard, to reading processing corresponding to that recording format, are built-in to a host device, and when it is discriminated that the data corresponds to a data format conforming to a second standard, one of the first or second standard system reading functions built-in to the host device is selectively caused to operate according to the recording format of the record data determined by the recording format determination means. In this way, correct reading processing of record data on a disc by the host device becomes possible regardless of whether the record configuration corresponds to the first of the second standard, in high efficiency recording mode.

DESCRIPTION OF THE PREFERRED EMBODIMENTS

Figure 1:
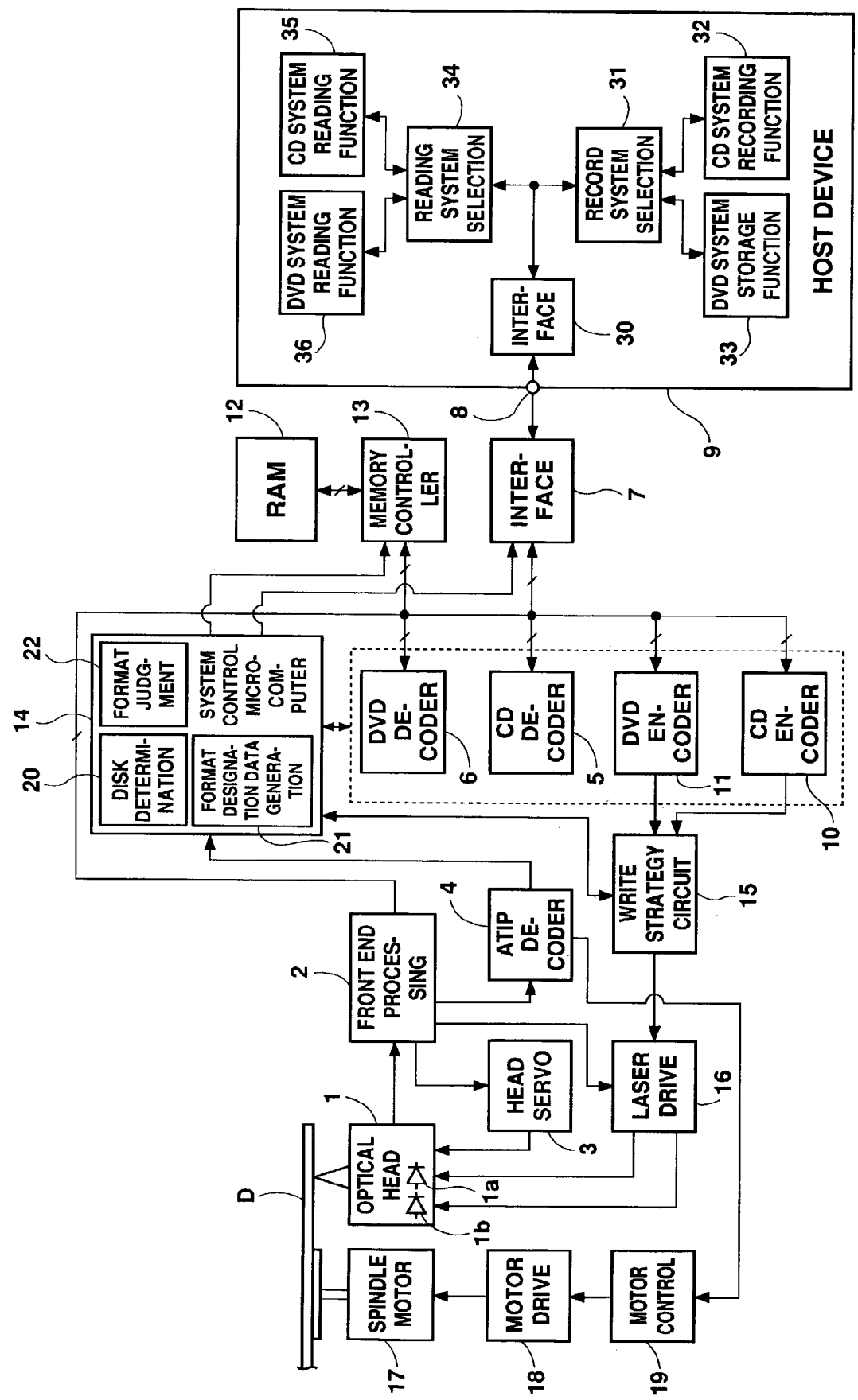
FIG. 1 is a circuit block diagram showing one embodiment of an optical disc device of the present invention.

FIG. 1 is a circuit block diagram showing one embodiment of an optical disc device of the present invention. The optical disc device of FIG. 1 can perform record and reading of CDS and reading of DVDs, and has a newly designed optical disc drive that can perform record signal processing and reading signal processing corresponding to a data format conforming to a DVD standard.

An optical head 1 irradiates a laser beam for tracing a signal track of disc, and carries out reading and writing of a data signal from or for the disc. This optical head 1 is provided with a first laser diode 1a for emitting a laser beam having a wavelength of 780 nm used in recording and reading of a CD, and a second laser diode 1b for emitting a laser beam having a wavelength of 650 nm used for reading of DVD, as light sources, and is constructed so that laser beams respectively emitted from each of the laser diodes 1a and 1b are irradiated to each of CD and DVD disc via an objective lens having two focal points (not shown).

A front end processing circuit 2 generates an RF signal (radio frequency signal) for the data signal readout from the disc using various outputs generated from the optical head 1, and as well as gain controlling the RF signal to an optimum level, performs equalization in response to each disc to generate binary data, and generates a focus error signal representing focus slip of the laser beam irradiated from the optical head 1 to the disc for the disc signal surface, and a tracking error signal representing tracking slip of the laser beam from a disc signal track.

A head servo circuit 3 carries out focus control to focus a main beam on the disc signal surface in response to the focus error signal and carries out tracking control to cause the main beam to follow the disc signal track in response to the tracking error signal, and also carries out thread feed control to feed the optical head 1 itself in the radial direction of the disc.

An ATIP decoder 4 demodulates an ATIP (Absolute Time In Pre-groove) address for a time information address from a wobble signal extracted from a pre-groove of a recording disc (CD-R, CD-RW) for the CD system by the front end processing circuit 2.

A CD decoder 5 carries out decoding processing of disc readout data output from the front end processing circuit 2 according to the data format specified by the CD standard. The CD standard format adopts EFM (eight to fourteen modulation) as a modulation code, and adopts CIRC (cross interleaved Reed-Solomon Code) as error correction code, and so the CD decoder 5 caries out decoding processing based on this modulation code and error correction code.

A DVD decoder 6 carries out decoding processing of disc readout data output from the front end processing circuit 2 according to the data format specified by the DVD standard. The DVD standard format adopts EFM-Plus (8–16) as a modulation code, and adopts RS (Reed-Solomon) Product-Code as error correction code, and so the DVD decoder 6 carries out decoding processing based on this modulation code and error correction code.

An interface 7 controls data handover to a host device 9, such as a personal computer connected via a connection terminal 8.

A CD encoder 10 performs encoding processing for input data input via the interface 7 based on a CD standard data format, and generates CD data having a data structure conforming to that data format.

A DVD encoder 11 performs encoding processing for input data input via the interface 7 based on a DVD standard data format, and generates DVD data having a data structure conforming to that data format.

A RAM 12 temporarily stores input data input from the interface 7, and as well as being used at the time of encoding processing by the CD encoder 10 and the DVD encoder 11, is used at the time of decoding processing by the CD decoder 5 and DVD decoder 6, and also holds reading data after decoding processing has been performed. A memory controller 13 controls writing to and reading from the RAM 12. A system control microcomputer 14 carries out control of the entire system relating to recording and reading of a disc.

A write strategy circuit 15 controls emitted light output of the optical head 1 so that optimum recording is performed to the disc, taking into consideration recording characteristics of each of the CD-R and CD-RW discs. A laser drive circuit 16 drives the first laser diode 1a and the second laser diode 1b in response to an APC (Automatic Power Control) circuit (not shown) included in the front end processing circuit 2 at the time of reading of a CD or DVD, as well as driving the first laser diode 1a of the optical head 1 in response to a pulse signal generated from the write strategy circuit 15 at the time of recording.

A spindle motor 17 rotatively drives the disc, a motor drive circuit 18 drives the spindle motor 17, and a motor control circuit 19 controls the motor drive circuit 18. The motor control circuit 19 carries out rotation control using a synchronization signal extracted from a data signal recorded on the disc or a bit clock, or with a fixed linear velocity method synchronized to an ATIP signal, demodulated using an ATIP decoder, and also carries out rotation control with a fixed angular velocity method using a pulse signal generated in response to rotation of the spindle motor 17.

The optical disc device of FIG. 1 constructed in this way is capable of reading CDs and DVDs, as well as being capable of standard recording mode recording conforming to a CD standard to both CD-R and CD-RW discs, and high efficiency recording mode for recording data corresponding to a DVD data format becomes possible to both CD-R and CD-RW discs.

Simple DVD recording using recordable DVD discs are not supported, but it goes without saying that an optical disc device supporting simple DVD recording is also possible.

First of all, a description will be given for CD-R/RW disc format.

Figure 2:
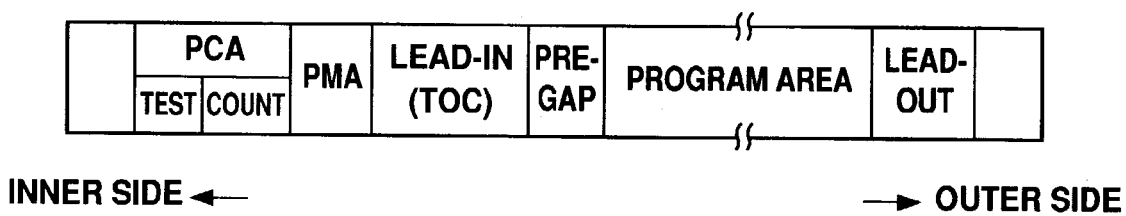
FIG. 2 is a drawing for describing CD-R/RW disc format.

A CD-R/RW disc, as shown in FIG. 2, has a PCA (Power Calibration Area), PMA (Program Memory Area), a lead-in area, a pre-gap area, a program area and a lead-out area formed from the inside of the disc to the outside.

The PCA is provided with a test area for performing test writes, and a counter area for storing the number of times test writes have been performed. The PMA is used as a region for temporary period storage of data and disc information for a track until a session is closed during recording to a disc, and the lead-in area stores disc information being stored in the PMA as TOC (Table of Contents) when a session is closed.

In the case of high efficiency recording mode, a special disc form at that is different from the disc format for CD-R/RW is adopted.

Figure 3:
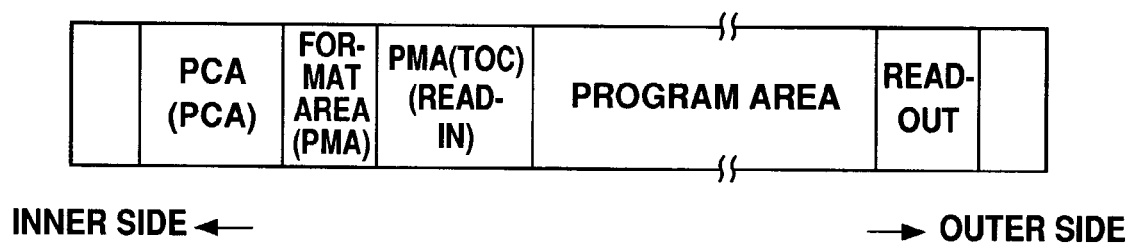
FIG. 3 is a drawing for describing a high efficiency recording mode disc format.

As shown in FIG. 3, this high efficiency recording mode disc format is made up of a PCA, a format area, a PMA (including a TOC area), a program area and a lead-out area, in that order from the inside to the outside of the disc.

With this disc format, in contrast to a normal (standard recording mode) CD-R/RW disc format shown in brackets, the PCA is provided as is in the PCA, the format area is provided in the PMA, and the PMA (including the TOC area) is provided in a lead-in area.

In the case of this high efficiency recording mode disc format, the lead-in area of the CD-R/RW disc format is used as the PMA including a TOC area, PMA data (PMD) also including TOC data for the CD on this PMA is recorded in a main channel, and this PMA data is used as data (PMD) equivalent to TOC data after closing of disc recording. (In this case, the PMA data lead-in is formed at the beginning.)

When carrying out disc formatting to allow recording in the high efficiency recording mode, the format area is padded across the entire region with special data unrelated to the PMA using a format command exclusive to this high efficiency recording mode, and this special data is configured, for example, using all "0", or using device information data such as a code representing manufacturer identification code, model number, serial number and high efficiency recording mode disc format.

Next, a method of determining a disc used in the optical disc device shown in FIG. 1 will be described using the flowchart shown in FIG. 4.

If a disc is installed, first of all the first laser diode 1a of the optical head 1 is driven so as to enter a reading state in response to level of reflected light from the disc using a laser drive circuit 14, then detection of a ATIP signal from disk is performed and determination as to whether the recording disc is a reading only disc is carried out by the disc determination means 20 (step a). If an ATIP signal is not detected, it is determined that it is a reading only disc (step b).

If a reading only disc is determined, it is then determined whether the disc is a CD or a DVD.

If an ATIP signal is detected by the processing of step a, the disc determination means 20 determines that it is a recording disc, namely a CD-R or CD-RW, and when this determination is carried out the PMA region on the recording CD disc format is accessed to carry out signal detection for this region (step c).

Then, it is judged whether or not data exists in the PMA region (step d), and in the event that it is determined that data does not exist it is determined by the disc determination means 20 that it is an unrecorded disc (step e).

On the other hand, if it is determined that data exists in the PMA region, it is next determined whether or not there is a data full state where data is stored across the entire PMA region (step f)

If it is determined that there is not a data full state, it is determined by the disc determination means 20 it is a disc that has been subjected to recording in standard recording mode (step g).

In the event that a data full state is determined, demodulation conforming to PMA in standard recording mode is tested to determine whether or not data is deciphered correctly (step h).

When that it is determined that the PMA region in standard recording mode is in a data full state, demodulation conforming to PMA in standard recording mode is tested to judge whether or not data is legible, and in the event that data is illegible and it is judged to be data unrelated to PMA, it is determined by the disc determination means 20 to be a disc that has been subjected to recording in high efficiency recording mode (step i), while if data is legible and it has been determined to be data relating to PMA, it is judged by the disc determination means 20 to be a disc that has been subjected to recording in standard recording mode (step g).

In this way, when it is determined that the disc that has been mounted is a disc that has been subjected to recording using the high efficiency recording mode, or in the event that it is determined that it is an unrecorded disc, a signal for this disc determination is derived via the interface 7, notified to the host device 9 via an interface 30 on the host device 9 side, and it is determined by the host device 9 that recording in high efficiency recording mode is possible.

On the other hand, when it is determined that the disc that has been mounted is a disc that has been subjected to recording using standard recording mode, or when it is determined that it is an unrecorded disc, a signal for this disc determination is notified to the host device 9, and it is determined by the host device 9 that recording in standard recording mode is possible.

Next, a description will be given of recording in standard recording mode.

Figure 4:
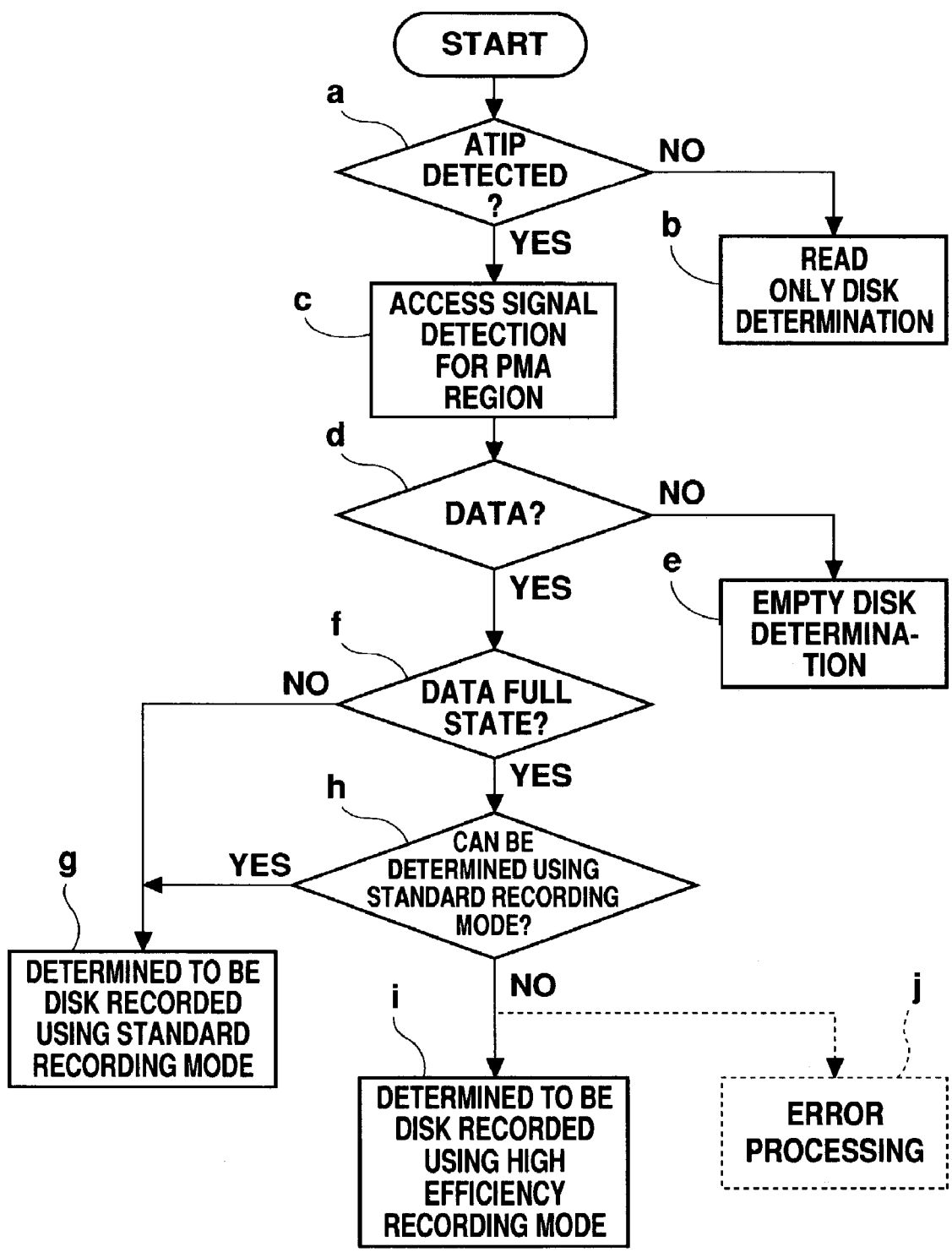
FIG. 4 is a flowchart for describing a method for determining a disc used in the optical disc device shown in FIG. 1.

If it is determined using the processing shown in the flowchart of FIG. 4 that recording in standard recording mode is possible, setting for carrying out recording using the standard recording mode becomes possible by the host device 9, and in this case, by setting the host device 9, a state where CD system recording functions 32 are caused to be executed by recording system selection means 31 is entered.

Therefore, the host device 9 generates a control command for controlling the optical disc device and its command operating sequence conforming to the CD standard.

Also, from the host device 9 to the optical disc device, a recording session, mode of a track and layout structure are designated in conformance with the CD standard.

A record command is transmitted from the host device 9 and if it is required to record to a disc in standard recording mode in the optical disc device, each circuit is switched to a state where it carries out normal recording mode disc recording by the system control microcomputer 14 so as to prepare a system for executing disc recording corresponding to the disc format of the recording CD in response to this requirement, and a recording signal processing system using the CD encoder 10 is selected.

Also, in response to standard recording mode for carrying out standard disc recording and determined disc classification, the front end processing circuit 2, head servo circuit 3, write strategy circuit 15 and laser drive circuit 16 have settings switched so as to carry out operation conforming to disc recording.

Also, using a recording command transmitted from the host device 9, the motor control circuit 19 controls the motor drive circuit 18 so as to drive a disc at a rotation speed corresponding to recording rate set using the system control microcomputer 14, so as to carry out recording operations using a required recording rate.

Then, according to a set recording rate, the write strategy circuit 15 controls the laser drive circuit 16 so that emitted light output of the first laser diode 1a of the optical head 1 is set to a predetermined record level conforming to that recording rate.

Before recording to a disc is started, the PMA of the disc is searched using ATIP information, data of that PMA is read out and conformation that session closure is not being carried out is performed, while at the same time, data of disc information is acquired and whether or not disc recording is possible and an address that can be recorded are ascertained.

Also, with respect to the set recording rate, a test write is carried out by converting emitted light output to the PCA of the disc in a stepwise manner, and emitted light output of the optical head 1 is set to an optimum record level so that error rate is minimized at the time of reading.

In a state where this type of disc recording preparation has been completed, if a command requesting recording and data are transmitted form the host device 9 via the interface 30, that command and data are received at the optical disc device via the interface 7, and the data requested to be recorded is written into the RAM 12 based on control of the memory controller 13.

If the storage amount for the data written into the RAM 12 reaches the data capacity for commencing encoding processing, data is read from the RAM 12 under the control of the memory controller 13, and this data is input to the CD encoder 10. The CD encoder 10 is operated based on control by the system control microcomputer 14, and the CD encoder 10 carries out encoding processing for the data and generates CD data having a data structure conforming to the data format of the CD standard.

This CD data is supplied to the write strategy circuit 15, and the write strategy circuit 15 generates recording pulses based on CD data so that disc recording can be carried out at an optimum recording level set using test writes to the PCA, taking into consideration the recording characteristics of a CD-R or CD-RW depending on the recording disc. In this way, the first laser diode 1a of the optical head 1 is driven, and record data is recorded to the disc by forming recording marks on the disc based on the CD data in response to the recording pulses.

Next, a description will be given for a recording operation of high efficiency recording mode for recording data corresponding to a DVD data format to each of a CD-R and a CD-RW disc.

In the event that it has been determined, with the processing shown in the flowchart of FIG. 4, that recording in high efficiency recording mode is possible, it becomes possible to perform setting to carry out recording using the high efficiency recording mode by the host device 9.

If setting for recording in high efficiency recording mode is carried out by the host device 9, the host device 9 is set again so that recording format is carried out in response to type of data recording on the disc based on an arbitrary one of a CD or a DVD standard.

If the data type is CD content, such as CD or CD-DA, the CD system recording function 32 is selected by the recording system selection means 31, and in this case, a state is entered where the CD system recording function 32 is executed by the recording system selection means as a result of setting the host device 9.

On the other hand, if the data type is DVD content, such as DVD video or DVD audio, the DVD system recording function 33 is selected by the recording system selection means 31, and in this case, a state is entered where the DVD system recording function 33 is executed by the recording system selection means as a result of setting the host device 9.

In the event that the CD system recording function 32 has been selected, the control processing configuration relating to disc recording using the host device 9 is carried out conforming to the CD standard, and the host device 9 generates a control command for controlling the optical disc device, and its command operation sequence conforms to the CD standard.

On the other hand, in the event that the DVD system recording function 33 has been selected, the control processing configuration relating to disc recording using the host device 9 is carried out conforming to a DVD standard, and the host device 9 generates a control command for controlling the optical disc device, and its command operation sequence conforms to the DVD standard.

As a result, the recording format for recording data to the disc can be designated selectively in accordance with the CD standard or DVD standard in a manner corresponding to the recording session, track mode and configuration structure conforming with the data format set by the host device 9.

Figure 5:
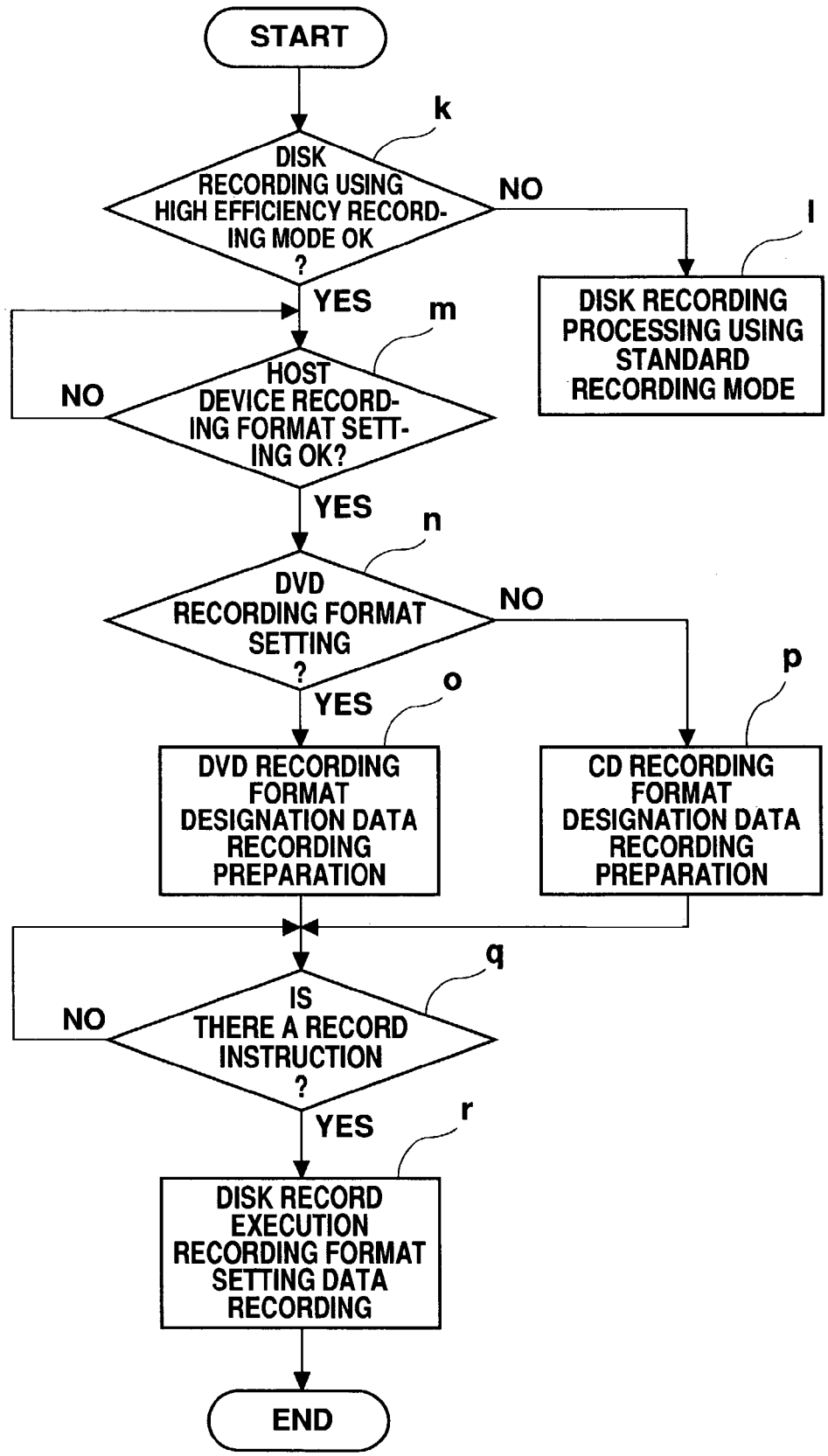
FIG. 5 is a flowchart for recording setting in high efficiency recording mode at recording.

FIG. 5 is a flowchart for when carrying out recording setting using the high efficiency recording mode. There are also sections overlapping with the previous description, and description will be given for the recording setting sequence using FIG. 5.

First of all, it is determined whether or not recording is possible using the high efficiency recording mode (step k).

Since the entire PMA region of the disc is subjected to padding using special data "0" when performing disc formatting before recording so as to enable recording in the high efficiency recording mode, a write state for data of this PMA region is detected to determine whether or not the disc is capable of recording in a high efficiency recording mode.

In the event that it is determined that recoding is not possible, processing transfers to disc recording in standard recording mode (step l).

If it is determined that recording in high efficiency recording mode is possible, a state of waiting for the host device 9 to perform recording format setting is entered (step m), and if recording format setting is carried out it is then determined whether or not the set recording format is DVD (step n).

If it is determined that the set recording format is DVD, DVD recording format designation data indicating conformance to DVD is generated by recording format designation data generation means 21, and prepared for recording this designation data in the lead-in area of the disc (step o).

On the other hand, if it is determined that the set recording format is CD, CD recording format designation data indicating conformance to CD is generated by the recording format designation data generation means 21, and prepared for recording this designation data in one part of the PMA data of the disc (step p).

After that, a state is entered to await a record instruction from the host device 9 (step q), and once the record instruction is received, disc recording conforming to the set recording format is carried out. Then, when recording to the disc is finished, recording format designation data indicating the recording format is recorded to the lead-in area as other PMA data for the disc (step r).

Operation of each circuit when carrying out disc recording in high efficiency recording mode is as described in the following.

A record command is transmitted from the host device 9, and if recording to disc using a high efficiency recording mode is requested to the optical disc device, in response to that request, each circuit is switched to a state for carrying out high efficiency recording mode disc recording by the system control microcomputer 14 so that it is possible to prepare a system for executing disc recording corresponding to the disc format of the recording CD, and a record signal processing system using the DVD encoder 11 is selected.

Also, according to the high efficiency recording mode for disc recording and the determined disc type, setting is switched so that the front end processing circuit 2, the head servo circuit 3, the write strategy circuit 15 and the laser drive circuit 16 carry out operations conforming to disc recording.

As with the standard recording mode, the motor control circuit 19 controls the motor drive circuit 18 so as to drive the disc at a rotational speed corresponding to the recording rate set by the system control microcomputer 14, so as to carry out recording operations at the requested recording rate. The write strategy circuit 15 controls the laser drive circuit 16 so as to set emitted light output of the first laser diode 1a of the optical head 1 to a predetermined record level appropriate to that recording rate according to the set recording rate.

As shown in FIG. 3, with the disc format corresponding to the high efficiency recording mode, since the PMA is located in the lead-in area with the recording CD disc format, this position is searched and PMA data is read out, and similarly to the standard recording mode, together with confirming that session closure is not being carried out, disc information data is acquired, and whether or not disc recording is possible and an address where recording can be carried out is ascertained.

Also, with respect to the set record rate, test writes are performed to the disc PCA by varying emitted light output in a stepwise manner, causing correspondence to the disc format of the high efficiency recording mode, and the emitted light output of the optical head 1 is set to an optimum record level so as to minimize error rate at the time of reading.

In the case of this high efficiency recording mode, as shown in Japanese Patent Laid-open No. 2002-56617 previously filed by the present applicant, actual record address of a multiple of the record density is calculated based on the ATIP address, and data is recorded for each unit based on this actual address to improve recording density per unit time. In this case, if the recording density is made a predetermined multiple n of the standard density (n>1), the actual record address corresponds to n times the ATIP address.

In disc recording preparation completed state, when a command requesting recording and data is transmitted from the host device 9, that command and data are transmitted via the interface 7, and data requested to be recorded is written to the RAM 12.

In the case of carrying out recording in the high efficiency recording mode, one of either CD or DVD is selected as the recording format for data to be recorded to the disc, and in response to this selection whether the control processing system configuration relating to disc recording by the host device 9 conforms to CD recording format or conforms to DVD recording format is set.

As a result, the host device 9 is operated by an operation sequence conforming to the selected recording format, and generates control commands.

If data is transmitted from the host device 9 and written into the RAM 12, and the amount of the data storage in the RAM 12 reaches the data capacity for starting encoding processing, data is read from the RAM 12, the DVD encoder 11 encodes this data, and generates DVD data having a data structure conforming to a data format of a DVD standard is generated.

This DVD data is supplied to the write strategy circuit 15, and depending on the recording disc the write strategy circuit 15 generates recording pulses based on DVD data so that it is possible to carry out disc recording at an optimum record level that has been set by test writes of the PCA, taking into consideration recording characteristics of the CD-R or CD-RW.

Here, the data format of the DVD standard has low redundancy compared to the data format of the CD standard, and since the redundancy of these data formats is different the data format of the DVD standard has a format efficiency of 1.49 times more than that of the data format of the CD standard.

Also, in the case of the high efficiency recording mode, as described previously, the actual recording address for record data recorded on the disc becomes n times (n>1) compared to the ATIP address, and it is possible to improve line recording density of record data recorded to disc while keeping track pitch the same.

In this case, since a laser beam having a wavelength of 780 nm conforming to CD is used, there is no significant improvement in line recording density, but it is possible to use an inexpensive optical head for CD recording, and also, since there is improved format efficiency compared to CD, if the improvement in line recording density is 1.35 times that of a CD, together with a format efficiency of 1.49 times it is possible for high efficiency recording mode to carry out recording at almost twice the recording density of the standard recording mode, since 1.35×1.49=2.01.

With respect to the high efficiency recording mode, record data recorded to the program area in response to setting of control processing configuration relating to disc recording by the host device 9 becomes a recording format conforming to the CD standard or DVD standard.

Therefore, in the case of recording CD content data to the disc, recording is performed using a recording format conforming to the CD standard, and in the case of recording DVD content data to the disc, recording is performed using a record configuration conforming to the DVD standard.

Recording format designation data corresponding to the recorded recording format is then recorded in the lead-in area as one PMA data.

Next, disc reading will be described.

If disc reading is requested by a read command transmitted from the host device 9, each circuit is switched by the system control microcomputer 14 to a state for carrying out disc reading, and at this time, the front end processing circuit 2, head servo circuit 3 and laser drive circuit 16 have setting switched so as to carry out operation appropriate to the type of disc being read so as to prepare a system for disc reading corresponding to a disc type discriminated by disc discrimination at the time of installing a disc, and a laser diode used in the optical head 1 and an encoder used are switched.

In the event that it is determined by disc discrimination that the installed disc is a reading only CD, the first laser diode 1a of the optical head 1 is operated with emitted light output set appropriately for reading corresponding to the disc type by the laser drive circuit 16, and reading of the disc D is carried out using the optical head 1.

A lead-out signal from this disc D is subjected to signal processing appropriate to the CD by the front end processing circuit 2, and an RF signal is binarized to generate CD data. This CD data is stored in the RAM 12 under control by the memory controller 13, and CD data stored in the RAM 12 is decoded by the CD decoder 5 for every unit (32 kbytes) for carrying out error correction.

On the other hand, a focus error signal and a tracking error signal generated by the front end processing circuit 2 are generated by processing appropriate to the CD and supplied to the head servo circuit 3.

CD data that has been decoded by the CD decoder 5 is demodulated to request data for the host device 9 according to the data format of the CD standard.

Next, a description will be given for the case where it has been determined that the installed disc is a DVD.

In this case, the second laser diode 1b of the optical head 1 is driven at an emitted light output power appropriate to reading corresponding to the type of disc by the laser drive circuit 16, and readout of the disc D is performed using the optical head 1.

A readout signal from this disc D is subjected to signal processing appropriate to DVD by the front end processing circuit 2, and an RF signal is binarized to generate DVD data. This DVD data is stored in the RAM 12 under control by the memory controller 13 and DVD data stored in the RAM 12 is decoded by the DVD decoder 6 for every unit (32 kbytes) for carrying out error correction.

On the other hand, a focus error signal and a tracking error signal generated by the front end processing circuit 2 are generated by processing appropriate to DVD and supplied to the head servo circuit 3.

DVD data that has been supplied to the DVD decoder 6 is demodulated to request data for the host device 9 using decode processing according to the data format of the DVD standard by this DVD decoder 6.

This data is temporarily stored in the RAM 12 as required, and then supplied via the interface 7 to the host device 9 connected to connection terminals 8.

Next, a description will be given of the case where it has been determined that an installed disc is a recordable CD.

Figure 6:
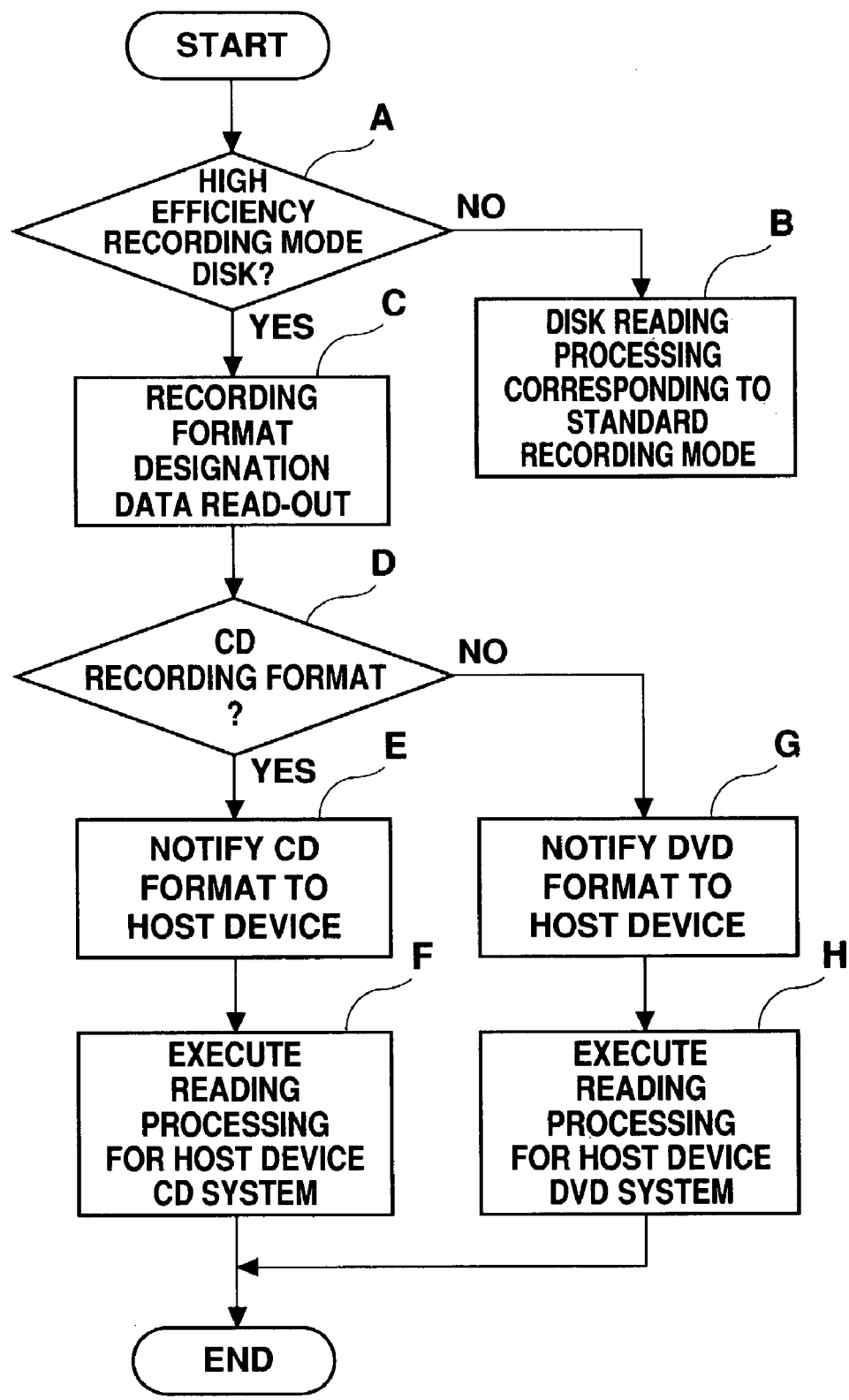
FIG. 6 is a flowchart showing a control sequence for a reading operation.

Once it has been determined that the disc is a recordable CD, reading operation control is carried out using the processing shown in the flowchart of FIG. 6.

First of all, it is determined whether or not the disc has been recorded using high efficiency recording mode (step A). This determination is carried out by detecting the recording state of the PMA region for the disc format of the CD-R/RW, namely, data in the format area for the high efficiency recording mode.

If it is determined that the disc has not been recorded using high efficiency recording mode, processing transfers to disc reading processing corresponding to standard recording mode (step B).

In this case, the emitted light output of the first laser diode 1a of the optical head 1 is set corresponding to a recording CD by the laser drive circuit 16. Operation of the remaining circuits is the same as for when it is determined that the disc is a reading only CD.

In the event that it is determined that the disc has been recorded using high efficiency recording mode, recording format designation data is read out from PMA data of the lead-in region (step C), and the recording format determination means 22 determines whether or not the recording format is CD format from this recording format designations data (step D).

If it is determined that the recording format is CD configuration, an information signal indicating CD configuration is sent to the host device 9 by the recording format determination means 22 (step E). The CD system reading function 35 is operated using the reading system selection means 34 according to the CD standard recording format, and the host device 9 enters a state for executing CD system reading processing (step F).

As a result, a control processing configuration relating to disc reading using the host device 9 is carried out in conformance to the CD standard, and data that has been transferred to the host device 9 is processed based on the CD standard data format.

If it is determined that the recording format is DVD, an information signal indicating DVD format is sent to the host device 9 by the recording format determination means 22 (step G), and the DVD system reading function 36 is operated using the reading system selection means 34 according to the DVD standard recording format, and the host device 9 enters a state for executing DVD system reading processing (step H).

As a result, a control processing configuration relating to disc reading using the host device 9 is carried out in conformance to the DVD standard, and data that has been transferred to the host device 9 is processed based on the DVD standard data format.

In this way, the reading system processing using the host device 9 is set according to the recording format.

On the other hand, the optical disc device performs read out of the disc D using a sequence according to the disc format of the high efficiency recording mode.

The optical head 1 having the first laser diode 1a is driven being at emitted light output power appropriately for reading corresponding to the type of disc using the laser drive circuit 16.

A read out signal read from the disc D by the optical head 1 is subjected to signal processing appropriate to DVD by the front end processing circuit 2, and an RF signal is binarized to generate DVD data. This DVD data is stored in the RAM 12 under control of the memory controller 13 and DVD data stored in the RAM 12 is decoded by the DVD decoder 6 for every unit (32 kbytes) for carrying out error correction.

On the other hand, a focus error signal and a tracking error signal generated by the front end processing circuit 2 are generated by processing appropriate to a recording CD and supplied to the head servo circuit 3.

DVD data that has been supplied to the DVD decoder 6 is demodulated to request data for the host device 9 using decode processing according to the data format of the DVD standard by this DVD decoder 6.

This data is temporarily stored in the RAM 12 as required, and then supplied via the interface 7 to the host device 9.

Here, since the host device 9 operates a reading function corresponding to the recording format determined by the recording format determination means 22 and reading processing is executed based on the recording format, data transferred to the host device 9 is correctly subjected to reading processing corresponding to CD in the case of a CD recording format and corresponding to DVD in the case of a DVD recording format.

For the case where a recording CD disc that has been recorded using high efficiency recording mode is installed in a CD-R/RW drive corresponding to a existing recording CD standard, an ATIP signal is detected at the time of installing the disc, and if it is determined to be a recording CD disc PMA acquisition is carried out, but since PMA data is full at this time and interpretation of acquired can not be carried out, it is handled as an abnormal disc and subjected to error processing, as in step j shown by the dotted line in FIG. 4.

In FIG. 1, the CD decoder 5, DVD decoder 6, CD encoder 10 and DVD encoder 11 have been shown as separate blocks for the sake of convenience, but generally an LSI having all of these circuits built-in may be used.

As described above, the present invention can provide an optical disc device capable of carrying out high efficiency recording to a recording disc corresponding to a disc format of a specified first standard even for data of a recording format corresponding to either of a first or a second standard conforming to a data format of a second standard having higher format efficiency than the first standard, and enabling a host device to carry out correct reading regardless of whether data recorded to a high efficiency recorded disc has a recording format corresponding to the first or the second standard.

In particular, since record data recording to a disc is caused to be selectively based on a recording format conforming to one of a first or a second standard, it is possible to carry out high efficiency recording conforming to data corresponding to either of the first or second standard using a recording instruction system from an existing host device, and it is possible to correctly carry out reading of data recorded to a high efficiency recorded disc using a reading instruction system from the current host device.

Also, since recording format designation data indicating which of the first or second standard the record data is based on is recorded on the disc, the recording format can be reliably identified.

Further, since recording format data is recorded in a lead-in area, it is possible to reliably confirm if there is a high efficiency recorded disc with recording format data conforming to either the first or second standard at the time of installing a disc.

What is claimed is:

1. An optical disc device, for recording data having a data format of a second standard that has a higher data format efficiency than a first standard, to a first recording disc on which a PCA is provided as an area for performing test writes and a PMA is provided as an area for temporary period storage of data until a session is closed during recording, both the PCA and the PMA being located on a side closer to the center of the disc than a lead-in area in accordance with a recording disc format of the first standard, comprising:

a first recording system signal processing circuit for subjecting input data to signal processing in order to generate recording data corresponding to a data format conforming to the first standard; and a second recording system signal processing circuit for subjecting input data to signal processing in order to generate recording data corresponding to a data format conforming to the second standard, wherein, when recording to the first recording disc corresponding to the first standard, it is possible to selectively use one of the first or second recording system signal processing circuits, and in the event that the recording data generated using the second recording system signal processing circuit is recorded to the first recording disc, a control processing format is switched for selectively recording the recording data generated using the second recording system signal processing circuit to the first recording disc based on a recording format conforming to one of the first or second standards, the entire PMA region is subjected to padding using special data, and disc information to be stored in the PMA according to the recording disc format of the first standard is recorded to the lead-in area.

2. The optical disc device of claim 1, having a host device provided with a first standard system recording function for implementing a control process configuration relating to disc recording in conformance with a data format specified in the first standard, and a second standard system recording function for implementing a control process configuration relating to disc recording in conformance with a data format specified in the second standard, these first and second standard system recording functions being selectively operated to selectively designate data recorded to a disc using the host device to a recording format conforming to a data format of the first and the second standard, wherein in the case of recording the recording data generated by the second record system signal processing circuit to the first recording disc, one of the first and the second standard system recording functions of the host device is selectively operated and the recording data generated by the second record system signal processing circuit is recorded to the first recording disc selectively based on a recording format conforming to one of the first and the second standard.

3. The optical disc device of claim 1, wherein recording format designation data indicating whether the recording format for the record data recorded on the first recording disc is based on the first or the second standard is recorded in a specified region of the disc.

4. An optical disc device, for reading a high efficiency recording mode disc on which a PCA is provided as an area for performing test writes and a PMA is provided as an area for temporary periods storage of data until a section is closed during recording, both the PCA and the PMA being located on a side closer to the center of the disc than a lead-in area in accordance with a recording format of a first standard, having recording data having a data format of a second standard that has a higher data format efficiency than the first standard, having a disc discrimination function for determining that there is a high efficiency recording mode disc, and selectively carrying out reading operations corresponding to a recording format based on the first and the second standard using a host device, comprising:

a first reading system signal processing circuit for carrying out signal processing for read out data read out from a disc in order to decode record data corresponding to a data format of a first standard;

a second reading system signal processing circuit for carrying out signal processing for read-out data read out from a disc in order to decode record data corresponding to a data format of a second standard; and recording format determining means for determining a recording format of the data when it has been discriminated that there is a high efficiency recording mode disc, wherein, whether read-out data read out from a disc corresponding to the first standard corresponds to a data format conforming to the first standard or the second standard is determined by reading special data padded in the PMA, such that, when it can be determined based on the read special data that the disc is a recording disc of the first standard, it is determined that the data is recorded in accordance with the data format of the first standard, and, when it cannot be determined based on the read special data that the disc is a recording disc of the first standard, it is determined that the data is recorded in accordance with the data format of the second standard, and when it is discriminated that the data corresponds to the data format conforming to the first standard, the read-out data is sent to the first reading system signal processing circuit, and when it is discriminated that the data corresponds to the data format conforming to the second standard, the readout data is sent to the second reading system signal processing circuit, and, said host device, comprising:

a first standard system reading function for reading the recording data recorded on the disc corresponding to the first standard using a high efficiency recording mode with a recording format based on the first standard, and a second standard system reading function for reading the recording data recorded on the disc corresponding to the first standard using a high efficiency recording mode with a recording format based on the second standard, and when it is discriminated that the data corresponds to a data format conforming to the second standard, one of the first or second standard system reading functions built-in to the host device is selectively operated according to the recording format of the recording data determined by the recording format determination means.

* * * * *